United States Patent [19]

Martin et al.

[11] Patent Number: 5,785,895
[45] Date of Patent: *Jul. 28, 1998

[54] BIODEGRADABLE CORROSION INHIBITORS OF LOW TOXICITY

[75] Inventors: Richard L. Martin, St. Louis; Jo Ann McMahon, Arnold; Bernardus A. Oude Alink, St. Louis, all of Mo.

[73] Assignee: Petrolite Corporation, St. Louis, Mo.

[*] Notice: The term of this patent shall not extend beyond the expiration date of Pat. No. 5,393,464.

[21] Appl. No.: 569,372

[22] Filed: Dec. 6, 1995

Related U.S. Application Data

[63] Continuation of Ser. No. 394,126, Feb. 24, 1995, abandoned, which is a continuation of Ser. No. 146,900, Nov. 2, 1993, Pat. No. 5,393,464.

[51] Int. Cl.$^6$ .......................... C23F 11/14; C23F 11/12; C23F 11/16
[52] U.S. Cl. .................. 252/389.23; 252/394; 252/395; 252/396; 422/15; 422/16
[58] Field of Search .................. 252/394, 389.23, 252/395, 396; 422/15, 16

[56] References Cited

U.S. PATENT DOCUMENTS

| | | | |
|---|---|---|---|
| 2,468,163 | 4/1949 | Blair et al. | 252/8.55 |
| 2,846,405 | 8/1958 | Hughes | 252/392 |
| 2,957,003 | 10/1960 | Johnson | 260/309.6 |
| 3,133,787 | 5/1964 | Kelley | 21/2.7 |
| 3,172,854 | 3/1965 | Scanley et al. | 206/524.4 |
| 3,195,332 | 7/1965 | Ranauto | 72/42 |
| 3,620,974 | 11/1971 | Stanford et al. | 252/8.55 B |
| 3,628,926 | 12/1971 | Eckert et al. | 44/63 |
| 3,836,462 | 9/1974 | Larsen | 210/58 |
| 3,846,071 | 11/1974 | Redmore | 21/2.7 A |
| 3,909,447 | 9/1975 | Redmore et al. | 252/389 A |
| 4,042,323 | 8/1977 | Redmore et al. | 21/2.5 A |
| 4,051,029 | 9/1977 | Redmore et al. | 210/58 |
| 4,066,398 | 1/1978 | Hwa | 21/2.7 A |
| 4,169,800 | 10/1979 | Dounchis | 252/49.9 |
| 4,311,662 | 1/1982 | Bellos | 422/12 |
| 4,339,349 | 7/1982 | Martin et al. | 252/389 A |
| 4,511,480 | 4/1985 | Outlaw et al. | 252/8.55 E |
| 4,584,021 | 4/1986 | Bartlett | 106/14.42 |
| 4,604,226 | 8/1986 | Bartlett | 252/389 A |
| 4,636,256 | 1/1987 | Valone | 106/14.15 |
| 4,687,590 | 8/1987 | Haack | 252/75 |
| 4,722,805 | 2/1988 | Martin | 252/389.21 |
| 4,945,992 | 8/1990 | Sacco | 166/310 |
| 5,380,466 | 1/1995 | Martin | 252/389.22 |

FOREIGN PATENT DOCUMENTS

| | | | |
|---|---|---|---|
| 1.158.594 | 6/1958 | France . | |
| 1.103.713 | 3/1961 | Germany . | |
| 2 104 897 | 3/1983 | United Kingdom | C07F 9/08 |
| 2 146 657 | 4/1985 | United Kingdom | C10M 161/00 |
| 2 170 509 | 8/1986 | United Kingdom | C10M 141/10 |

OTHER PUBLICATIONS

Chemical Abstract 99:75442 JP 58013669 (1983).
Chemical Abstract 73:6558 DE 1939789 (1970).
Kochelek, J.T. and Stone, P.J., SPE 18491, 1989, "Monitoring Sessile Bacteris Contamination and the Associated Corrosion in a West Texas Water Injection System".

*Primary Examiner*—Sharon Gibson
*Assistant Examiner*—Valerie Fee
*Attorney, Agent, or Firm*—Howell & Haferkamp, L.C.

[57] ABSTRACT

A method for inhibiting corrosion in an aqueous medium is disclosed. The method comprises incorporating into the medium an amount of a water-soluble corrosion inhibitor sufficient to inhibit corrosion. The corrosion inhibitor comprises an N-ethoxy, 2-substituted imidazoline, the N-ethoxy substituent having from one to about thirty ethoxy units and the 2-substituent being an unsaturated or polyunsaturated fatty chain of from about six to about thirty carbons. If the medium is sweet, the inhibitor further comprises a phosphate ester derived from a water-soluble oxyethylated, straight chain alcohol of from about two to about thirty carbons. Corrosion inhibitor compositions useful in such method are also disclosed.

36 Claims, No Drawings

BIODEGRADABLE CORROSION INHIBITORS OF LOW TOXICITY

This is a continuation application of U.S. application Ser. No. 08/394,126, filed Feb. 24, 1995, now abandoned (which is a continuation application of U.S. Ser. No. 08/146,900, filed Nov. 2, 1993, now U.S. Pat. No. 5,393,464).

BACKGROUND OF THE INVENTION

1. Field of the Invention

The present invention relates to corrosion inhibition and more particularly to inhibition of corrosion in environmentally sensitive aqueous media.

2. Description of Prior Art

Corrosion of metal surfaces in aqueous media has long been an intractable problem. This problem is especially troublesome in deep sea operations such as off-shore oil production, where corrosion inhibitors must satisfy several criteria in order to be effective in the demanding conditions encountered in such operations. A number of corrosion inhibitors have been developed in attempts to satisfy the demands imposed by such activities. However, because it is difficult to meet each of several independent corrosion inhibition criteria, these efforts have met with varying, but not totally satisfactory, success.

Nevertheless, increasing environmental concerns have introduced even further criteria for corrosion inhibitors to satisfy. In particular, the corrosion inhibitor should be compatible with the sensitive life forms indigenous to the medium into which the inhibitor is incorporated.

For example, in North Sea operations, survival not only of fish, but also, for instance, of algae and the microorganism *Skeletonema costatum* is of concern. Thus, environmental constraints have been imposed on the types of compositions used in the North Sea, thereby to protect such organisms. However, commonly available commercial inhibitors have been found to be too toxic to the organism. More specifically, even a concentration of less than one part per million by weight (ppm) of conventional inhibitors has been found to retard growth of *Skeletonema costatum* test populations by 50% in 96 hours. This may be written as $EC_{50}<1$ ppm. Thus, a corrosion inhibitor having an $EC_{50}$ greater than 1 ppm is desired.

In addition, it is desired that the inhibitor meet several other environmental criteria as well. For example, the inhibitor should be sufficiently biodegradable so that within 28 days after treatment, the inhibitor has degraded at least 70% in terms of the theoretical oxygen consumption required for complete degradation (i.e.; the biochemical oxygen demand BOD-28≧70%). Of course, it is more desirable that complete degradation occur within 28 days. That is, the goal is BOD-28=100%.

Further, the water-solubility of the inhibitor should be sufficient to avoid or to minimize bio-accumulation that otherwise can result with fat soluble inhibitors in lower life forms. The fat soluble inhibitors may become more concentrated as they move up the food chain. This may be quantified by measuring the resulting concentration of inhibitor in the octanol phase and in the water phase of an n-octanol/water medium into which the inhibitor has been injected, and dividing the former by the latter. It is desired that the logarithm (base 10) of that quotient be less than three. Stated another way, log K or "partitioning" should be less than three in terms of a log value.

Moreover, because evaporation of a toxic solvent (if any) would be undesirable, the solvent evaporation factor (YL) should not be greater than three. And, because of the dangers of flammability, the flash point should be greater than 56° C.

Another problem that has been encountered is the tendency of some inhibitors to form a floc with calcium ions that may be present in the medium to be treated, clouding the medium and short-circuiting the effectiveness of the inhibitor. Accordingly, the inhibitor should not tend to form a floc with calcium ions as well as meet the significant efficacy and environmental criteria.

Commercial inhibitors generally have not been found to meet such demanding criteria, especially while still affording highly effective corrosion inhibition. Thus, inhibitors that not only provide satisfactory corrosion inhibition, but satisfy such environmental concerns as well, are still being sought. In fact, because of increasing environmental emphasis, the search is intensifying.

SUMMARY OF THE INVENTION

The present invention, therefore, is directed to a novel method for inhibiting corrosion in an aqueous medium. The method comprises incorporating into the medium an amount of a water-soluble corrosion inhibitor sufficient to inhibit corrosion. The corrosion inhibitor comprises an N-ethoxy, 2-substituted imidazoline. The N-ethoxy substituent has from one to about thirty ethoxy units and the 2-substituent is an unsaturated or polyunsaturated fatty chain of from about six to about thirty carbons. If the medium is sweet, the inhibitor further comprises a phosphate ester derived from a water-soluble oxyethylated derivative of a straight chain alcohol of from about two to about thirty carbons.

The present invention is also directed to a corrosion inhibitor containing such imidazoline and phosphate ester in an environmentally acceptable solvent such as water or a glycol or a mixture thereof.

Among the several advantages of this invention, may be noted the provision of a method for inhibiting corrosion in environmentally sensitive aqueous media; the provision of such method that is environmentally compatible with such media; the provision of such method that does not tend to form a floc with calcium ions that may be in the media; and the provision of a corrosion inhibitor that may be used in such method.

DETAILED DESCRIPTION OF THE PREFERRED EMBODIMENTS

In accordance with the present invention, it has been discovered that incorporating into a medium a corrosion inhibitor that comprises an N-ethoxy,2-substituted imidazoline, the N-ethoxy substituent having from one to about thirty ethoxy units and the 2-substituent being an unsaturated or polyunsaturated fatty chain of from about six to about thirty carbons and, if the medium is sweet, that further comprises a phosphate ester derived from a water-soluble oxyethylated derivative of a straight chain alcohol of from about two to about thirty carbons, affords surprisingly superior corrosion inhibition with little or no deleterious environmental effects on the medium. Moreover, no tendency to form a floc with calcium has been observed.

Compositions having little or no deleterious environmental effects on a medium of concern are described herein as "environmentally compatible". This requirement should include such considerations as toxicity, water-solubility, biodegradability, and so forth. Non-toxicity is referred to herein. However, it is recognized that nearly any substance may be toxic at some concentration. As used herein, therefore, non-toxicity refers to very low toxicity in the concentrations to be employed. For example, for off-shore drilling and production, it refers to compositions having an $EC_{50}$ greater than 1 ppm by weight for *Skeletonema costatum*. With respect to biodegradability, a BOD-28 of greater than 70% is desired.

The N-ethoxy,2-substituted imidazoline may be prepared by reacting an N-substituted ethylene diamine with a fatty acid to form an imidazoline and ethoxylating the imidazoline if necessary. The N-substituted ethylene diamine is of the form $H_2NCH_2CH_2NHRMH$, wherein R is an organic moiety and —MH represents a terminal group that includes a hetero atom such as oxygen, nitrogen or sulfur and at least one hydrogen, thereby to provide a site for attachment of ethylene oxide. The organic moiety may be any of a wide range of possibilities, but a moiety that is environmentally compatible should be selected. Although the organic moiety may include nitrogen atoms that would render the N-substituted ethylene diamine a polyamine of three or more amino groups, for the sake of simplicity and in view of the fact that the two nitrogen atoms identified explicitly in the formula above are those relevant to the functionality of concern, the reactant will be referred to herein simply as an N-substituted ethylene diamine. Nevertheless, it should be understood that higher polyamines are contemplated if the presence of further amino groups beyond the noted two is a result of inclusion in the R group. Preferably, R is an alkylene, an arylene, or an aralkylene. More preferably, R is ethylene, isopropylene or —$(CH_2CH_2O)_n(CH_2CH_2)$— wherein n is an integer from 1 to about 30. Even more preferably, R is ethylene or the group —$(CH_2CH_2O)_n(CH_2CH_2)$— wherein n is an integer from about one to about seventeen. Most preferably, R is ethylene.

The group —MH, as noted, should provide a site for attachment of ethylene oxide for ether or polyether formation. Preferably, —MH represents —OH, —$NH_2$ or —SH, most preferably —OH. Thus, preferred N-substituted ethylene diamines include, for example, $NH_2CH_2CH_2NH$—$CH_2CH_2OH$, $NH_2CH_2CH_2NH$—$CH_2CH(CH_3)OH$ and $NH_2CH_2CH_2NH$—$CH_2CH_2NH_2$, most preferably, $NH_2CH_2CH_2NH$—$CH_2CH_2OH$.

The fatty acid also should be selected for environmental compatibility. Thus, a preferred fatty acid is a mono- or poly-unsaturated fatty acid of from six to about thirty, preferably about twelve to about twenty carbons. The term polyunsaturated refers to two or more points of unsaturation. Thus, the fatty acid is of the form R'COOH, wherein R' is an unsaturated or polyunsaturated chain of from about five to about thirty carbons, preferably about eleven to about twenty carbons. Particular suitable fatty acids have been found to be oleic, linoleic and eladeic acid.

The diamine and fatty acid are reacted in about a 1:1 molar ratio under a vacuum with the addition of heat, such as up to about 240° C., until all water is removed. The resulting imidazoline is then ethoxylated if necessary to build the N-substituent of the imidazoline to include a total of from one to about thirty ethoxy units as necessary to render the product water-soluble. As used herein, the term water-soluble means miscible with water at the concentration to be employed for corrosion inhibition. Thus, the resulting product is of the form

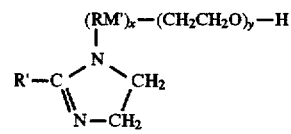

wherein R and R' (the residue of the fatty acid) are as defined above, M' is the residue from the —MH group after removal of the H's by polyethoxylation, preferably —O—, =$N(CH_2CH_2O)_y$—H or —S—, most preferably —O—, x is 0 or 1 and y is an integer from zero to about thirty selected such that the total number of ethoxy units in the N-substituent is from one to about thirty (preferably two to about eighteen), depending on the number necessary to render the imidazoline water-soluble.

The phosphate ester is such as those described in, for example, U.S. Pat. No. 4,339,349 to Martin (a present co-inventor) et al. or U.S. Pat. No. 3,846,071 to Redmore. In particular, the phosphate ester may be prepared by reacting an ethoxylated alcohol with polyphosphoric acid or with phosphoric anhydride. Thus, the first step may involve ethoxylating an alcohol. Generally, the alcohol is environmentally compatible and so is one that is non-toxic to aquatic life in the medium to be treated and biodegradable and can be made water-soluble upon ethoxylation. Typically, therefore, a $C_2$ to $C_{30}$, preferably a $C_4$ to $C_{20}$, and even more preferably, a $C_5$ to $C_{15}$, alcohol is practical. The alcohol should be generally straight chain, meaning little or, preferably, no branching, in order to afford favorable biodegradability. Optimally, each carbon atom of the alcohol should have at least one hydrogen to provide superior biodegradability. Alfol 8–10 (a mixture of $C_8$ to $C_{10}$ alcohols) has been found to be especially suitable.

The alcohol may be ethoxylated by standard techniques. Thus, the alcohol may be heated with a base or amine catalyst to about 100° to about 150° C., depending on the catalyst, and ethylene oxide added thereto. The resulting ethoxylated alcohol is of the form R"O—$(CH_2CH_2O)_zH$, wherein R" is a substituted or unsubstituted alkyl, aryl or aralkyl group of from about two to about thirty, preferably from about four to about twenty, more preferably from about five to about fifteen, carbons. Desirably, R" is an alkyl group, especially an unsubstituted alkyl group of from about two to about thirty, preferably from about four to about twenty, more preferably from about five to about fifteen, carbons. As noted, it is optimal that each carbon of R" should have at least one hydrogen bonded thereto. The relative proportion of ethylene oxide to alcohol depends on the degree of ethoxylation desired to provide sufficient water-solubility and biodegradability. Generally, the heavier the alcohol, the greater the degree of ethoxylation required. Although any degree of ethoxylation is feasible, economic practicalities suggest that it is not desirable that more than about ten moles of ethylene oxide per mole of alcohol be used. Therefore, z is preferably an integer from one to about ten, more preferably from about two to about five, especially about two to about three.

A phosphate ester then is prepared from the ethoxylated alcohol. Techniques for preparation of phosphate esters are well known. See, for example, U.S. Pat. No. 4,722,805 to Martin (a present co-inventor) and U.S. Pat. No. 3,846,071 to Redmore, which are incorporated herein by reference. The ester may be prepared by reacting the ethoxylated alcohol with polyphosphoric acid at a temperature of from about 75 to about 100° C. to form a mono-ester. Alternatively, the phosphate ester may be prepared by a reaction of the ethoxylated alcohol with phosphoric anhydride to form a di-ester/mono-ester mixture.

As with the compositions and method taught in U.S. Pat. No. 3,846,071, the imidazoline may be used without the phosphate ester for corrosion inhibition in sour systems, but it has been found that a blend of the imidazoline and phosphate ester yields improved corrosion inhibition in such systems. Sweet systems should be treated with the blend. The weight ratio of imidazoline to phosphate ester is preferably about 1:1 to about 4:1, most preferably about 2:1.

The blend (as well as imidazoline employed without phosphate ester) may also incorporate a solvent, particularly an environmentally compatible solvent such as water, ethylene glycol or propylene glycol. The blends have been found generally to be water-soluble, but some compositions, especially those of a low degree of ethoxylation, have been found to be merely water-dispersible. In such cases, inclusion of solvents such as isopropyl alcohol may result in a clear solution, but environmental considerations render use of isopropyl alcohol undesirable. Typically, the solvent may make up from about a third to about two thirds, preferably about a half, by weight of the additive. Thus, if no other components are present, the weight ratio of actives (i.e., combination of imidazoline and phosphate ester if a blend is used; imidazoline if no phosphate ester is present) to solvent is from about 2:1 to about 1:2, preferably about 1:1.

Each component of the additive composition should be selected with consideration for environmental compatibility. Thus, as noted previously, in the specification, the imidazoline and the diamine and fatty acid from which it is formed, the phosphate ester and the alcohol from which it is formed, and the solvent, should be nontoxic to aquatic life in the environment in which it is to be employed. As discussed, this consideration has dictated preferred aspects of these various components and reactants, with particular concern for not only non-toxicity, but also water-solubility, biodegradability, and so forth. Of course, it is undesirable to include any further component that would be counter to these concerns. Accordingly, it is preferable that the additive composition be free of toxic components (components toxic to the aquatic life in the medium in which it is to be employed) and components that are insoluble in water or are environmentally harmful substances that are not biodegradable.

The additive composition may be employed by simple addition to the medium to be treated. Such media are aqueous and include sea water as, for example, in off-shore oil production. Preferably, the effective concentration of inhibitor actives (that is, the concentration at which corrosion inhibition is provided) is in the range of from about 10 to about 1,000 ppm by weight. Of course, greater concentrations may be employed, but may be wasteful over-dosage or, at very high dosages, might raise the environmental impact to significant levels. Regardless, rapid dilution takes place quickly in applications in such media as overboard brine from off-shore oil production (as in the North Sea), leading to even less environmentally significant dosages.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples, all percentages are given on a weight basis unless otherwise indicated.

EXAMPLE 1

Corrosion rate tests were conducted on inhibitors of this invention (designated herein as Inhibitor A) versus a blend of a quaternary ammonium compound and an acetate salt of an imidazoline, which is a commercial corrosion inhibitor sold by Petrolite and is identified herein as Inhibitor X. The blend of this invention tested was a 1:2:6 by weight blend of (1) a phosphate ester derived from reaction of polyphosphoric acid and Alfol 8–10 ethoxylated with 3 moles of ethylene oxide per mole Alfol 8–10, (2) an imidazoline that corresponds to the formula

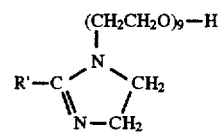

wherein R' is the residue from oleic or linoleic acid (the imidazoline was derived from a mix of oleic and linoleic acid), and (3) propylene glycol plus water.

The toxicity ($EC_{50}$) of Inhibitor X was measured as 0.18 ppm versus 1 to 10 for Inhibitor A. The biodegradability (BOD-28) of Inhibitor X was found to be 28% versus 100% for Inhibitor A. In fact, for Inhibitor A 100% degradation was found by thirteen days. Partitioning of Inhibitor X was determined to be about 2 versus about 0 for Inhibitor A. The solvent evaporation factor (YL) of Inhibitor X was measured at 2 versus 0 for Inhibitor A. The flash point of Inhibitor X was found to be 27° C. and over 93° C. for Inhibitor A.

Kettle tests and loop tests were conducted. For the kettle tests, various amounts of inhibitors were added to aqueous solutions of 3% sodium chloride, which were then stirred mildly for 24 hours at room temperature. "Sweet" test solutions were sparged continuously with carbon dioxide. "Sour" test solutions were sparged with carbon dioxide and then enough $Na_2S \cdot H_2O$ was added to give a hydrogen sulfide concentration of 50 ppm and a pH of 5.5. The sour solutions were then sealed. AISI-type 1020 steel corrosion coupons (9 $cm^2$) were weighed, added to the solutions before the stirring, removed from the solutions at the completion of the stirring, cleaned and reweighed. Corrosion rates were calculated based on the weight loss. The results were as follows, with the inhibitor concentration (dose) being given in ppm, the corrosion rates being given in mils per year (mpy) and many of the results shown being averages of duplicate runs.

| Inhibitor | Dose | Sweet | Sour |
|---|---|---|---|
| None | — | 40 | 45 |
| Inhibitor X | 250 | 6.3 | 2.4 |
| Inhibitor X | 50 | 12 | 8.2 |
| Inhibitor A | 250 | 6.1 | 1.8 |
| Inhibitor A | 50 | 9 | 2.9 |
| Inhibitor A | 25 | 14 | 4.8 |

For the loop tests, carbon dioxide saturated mixed brine was pumped through cylindrical coupons for 24 hours in a pump-around loop. Pressure was maintained at 45 psig and the temperature was maintained at 140° F. Flow was maintained at a sufficient rate to give a high shear rate; namely, 47, 79 or 175 Pa (pascals), depending on the trial. The following results were obtained, with the inhibitor concentration (dose) being given in ppm and the corrosion rates being given in mils per year (mpy).

| Inhibitor | Dose | 47 Pa | 79 Pa | 175 Pa |
| --- | --- | --- | --- | --- |
| None | — | 1,000 | 1,100 | 2,100 |
| Inhibitor X | 250 | 16 | 21 | 14 |
| Inhibitor X | 25 | 49 | 58 | 69 |
| Inhibitor A | 50 | 18 | 22 | 27 |
| Inhibitor A | 25 | 19 | 31 | 24 |

EXAMPLE 2

Further corrosion inhibitors were prepared in accordance with this invention. The inhibitors correspond to the combinations identified in the following table. "# of EtO" refers to the number of ethoxy units in the n-polyethoxy chain on the imidazoline (all imidazolines were derived from a mix of oleic and linoleic acids). "Phos." refers to whether the phosphate ester was derived from polyphosphoric acid ("Poly") or phosphoric anhydride ("$P_2O_5$"). "Prop." refers to the weight ratio of imidazoline to phosphate ester to solvent. "IPA" refers to isopropyl alcohol. "NBA" refers to n-butyl alcohol. "EG" refers to ethylene glycol and "PG" refers to propylene glycol:

| Inhibitor | Imidazoline | Phosphate Ester | | |
| --- | --- | --- | --- | --- |
| Prop. | # of EtO | Alcohol | Phos. | Solvent |
| B 1:0:0 | 3 | No phosphate ester | | None |
| C 1:0:0 | 6 | No phosphate ester | | None |
| D 1:0:0 | 9 | No phosphate ester | | None |
| E 1:0:0 | 12 | No phosphate ester | | None |
| F 1:1:2 | 9 | Alfol 8-10 | Poly | Water |
| G 1:1:2:1.5 | 9 | Tri-decyl | $P_2O_5$ | Water + IPA |
| H 2:1:3 | 9 | Alfol 8-10 | Poly | Water |
| I 4:1:5 | 6 | Alfol 8-10 | Poly | Water |
| J 2:1:3:1 | 6 | Tri-decyl | $P_2O_5$ | Water + IPA |
| K 2:4:6:5 | 6 | Tri-decyl | $P_2O_5$ | Water + IPA |
| L 2:1:3 | 3 | Tri-decyl | $P_2O_5$ | NBA |
| M 8:4:15:9 | 9 | Alfol 8-10 | Poly | Water + EG |
| N 8:4:15:9 | 9 | Alfol 8-10 | Poly | Water + PG |

These inhibitors were then compared with a variety of other additives in corrosion tests in sweet and sour systems. The following results were obtained, with the inhibitor concentration (dose) being given in ppm and the corrosion rates being given in mils per year (mpy).

| | | Corrosion Rate | |
| --- | --- | --- | --- |
| Inhibitor | Dose | Sweet | Sour |
| None | — | 40 | 45 |
| Oleyl sarcosine* | 250 | 23 | 25 |
| Sodium lauryl sarcosine (30% solution) | 700 | 17 | 14 |
| Sodium lauryl sarcosine + Betaine | 250 | 13 | 5.7 |
| Coco-benzo-quat. + pyridine + phosphate ester | 250 | 18 | 2.3 |
| Coco-benzo-quat. + pyridine + phosphate ester | 60 | 11 | 3.2 |
| OEX-6673-4 from Westvaco | 250 | 8.4 | 4.6 |
| Unethoxylated imidazoline* | 250 | 14 | 12 |
| Inhibitor B* | 250 | 9 | 3.1 |
| Inhibitor C | 250 | 11 | 5 |
| Inhibitor D | 250 | 11 | 5 |
| Inhibitor E | 250 | 9.6 | 5 |
| Inhibitor E | 100 | 7 | 3.1 |
| Inhibitor F | 250 | 7.4 | 2.4 |
| Inhibitor G* | 350 | 5.5 | 3.7 |
| Inhibitor G* | 70 | 9.4 | 4.8 |
| Inhibitor G | 35 | 9 | 11 |
| Inhibitor H | 250 | 6.1 | 1.8 |
| Inhibitor I | 250 | 7 | 5.5 |
| Inhibitor I | 50 | 8.3 | 6.6 |
| Inhibitor J | 300 | 5.9 | 7 |
| Inhibitor J | 1,000 | 6.3 | NA |
| Inhibitor K* | 400 | 6.6 | 4.4 |
| Inhibitor L* | 250 | 5.8 | 2.6 |
| Inhibitor M | 250 | 7.4 | 2.6 |
| Inhibitor N | 250 | 6.1 | 1.8 |

*Inhibitor was dispersible as opposed to soluble at the noted dose.

EXAMPLE 3

Shake tests were conducted on Inhibitors L and M of Example 3 as well as an acetate salt of imidazoline in various media. Medium 1 was formed by mixing kerosene (20 ml) into an aqueous solution (100 ml) of 5% NaCl. Medium 2 was an aqueous solution of 6% NaCl and 2% $CaCl_2 \cdot H_2O$. Medium 3 was an aqueous solution of 6% NaCl and 4% $CaCl_2 \cdot H_2O$. The following results were obtained, wherein Dose is the concentration of the inhibitor added and the Appearance is the appearance of the top of the medium (Top), the kerosene phase (Kerosene), the interface between the kerosene phase and the water phase (Interface) and the water phase (Water) after five minutes.

| Me-dium | Inhibitor | Dose | Appearance | | | |
| --- | --- | --- | --- | --- | --- | --- |
| | | | Top | Kerosene | Interface | Water |
| 1 | None | — | Clear | Clear | Sharp | Slight Haze |
| 1 | Inhibitor X | 1% | Foam | Haze | None | Haze |
| 1 | Inhibitor M | 1% | Clear | Half Clear | Sharp | Haze |
| 1 | Inhibitor L | 1% | Clear | Almost Clear | Sharp | Haze |
| 2 | Inhibitor M | 500 ppm | Fair | | | Clear |
| 2 | Inhibitor M | 1% | Fair | | | Clear |
| 3 | Inhibitor M | 1% | Fair | | | Slight Haze |

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A water-soluble, biodegradable corrosion inhibitor composition comprising (1) an N-ethoxy,2-substituted imidazoline of the formula:

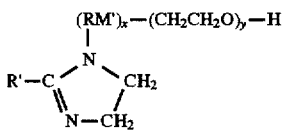

wherein R is a divalent organic moiety, M' is selected from the group consisting of —O—, =N(CH₂CH₂O)ᵧ—H and —S—, x is 0 or 1, each y is independently an integer from 0 to about 30 such that the group —(RM')ₓ—(CH₂CH₂O)ᵧ—H and contains a total of 1 to about 30 ethoxy units and R' is an unsaturated or polyunsaturated fatty chain of from about six to about thirty carbons, (2) a phosphate ester derived from a water-soluble oxyethylated, straight chain alcohol of from about two to about thirty carbons, and (3) a solvent selected from the group consisting of water, ethylene glycol and propylene glycol.

2. A corrosion inhibitor as set forth in claim 1 wherein the corrosion inhibitor has an EC₅₀ for *Skeletonema costatum* greater than 1 ppm by weight.

3. A composition as set forth in claim 1 wherein R is ethylene or —(CH₂CH₂O)ₙ(CH₂CH₂)—, wherein n is an integer from one to seventeen.

4. A method for inhibiting corrosion of a metal surface in an aqueous liquid containing *Skeletonema costatum*, fish, algae or a combination thereof, the method comprising incorporating into the liquid an amount of a water-soluble corrosion inhibitor sufficient to inhibit corrosion of the metal surface, the corrosion inhibitor comprising (1) an N-ethoxy, 2-substituted imidazoline of the formula:

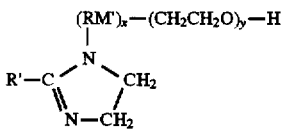

wherein R is a divalent organic moiety, M' is selected from the group consisting of —O—, N(CH₂CH₂O)ᵧ—H, and —S—, x is 0 or 1, each y is independently an integer from 0 to 30 such that the group —(RM')ₓ—(CH₂CH₂O)ᵧ—H contains a total of 1 to 30 ethoxy units and R' is an unsaturated or polyunsaturated fatty chain of from six to thirty carbons, and (2) a phosphate ester derived from a water-soluble oxyethylated, straight chain alcohol of from two to thirty carbons.

5. A method as set forth in claim 4 wherein the corrosion inhibitor further comprises a solvent selected from the group consisting of water, ethylene glycol and propylene glycol.

6. A method as set forth in claim 4 wherein the fatty chain is straight and has from twelve to twenty carbons.

7. A method as set forth in claim 6 wherein the fatty chain is the residue from a fatty acid selected from the group consisting of oleic acid, linoleic acid and eladeic acid.

8. A method as set forth in claim 6 wherein each y is an integer from two to eighteen.

9. A method as set forth in claim 4 wherein the liquid is sweet.

10. A method as set forth in claim 4 wherein the corrosion inhibitor has an EC₅₀ for *Skeletonema costatum* greater than 1 ppm by weight.

11. A method as set forth in claim 4 wherein x is 1 and R is selected from the group consisting of alkylenes, arylenes and aralkylenes.

12. A method as set forth in claim 11 wherein R is ethylene, isopropylene or —(CH₂CH₂O)ₙ(CH₂CH₂)—, wherein n is an integer from one to thirty.

13. A method as set forth in claim 12 wherein R is ethylene or —(CH₂CH₂O)ₙ(CH₂CH₂)—, wherein n is an integer from one to seventeen.

14. A method for inhibiting corrosion of a metal surface in a aqueous liquid containing *Skeletonema costatum*, fish, algae or a combination thereof, the method comprising incorporating into the liquid an amount of a water-soluble corrosion inhibitor sufficient to inhibit corrosion of a metal surface, the corrosion inhibitor comprising an N-ethoxy,2-substituted imidazoline of the formula:

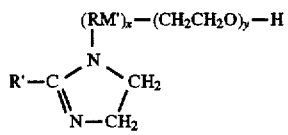

wherein R is a divalent organic moiety, M' is selected from the group consisting of —O—, =NH(CH₂CH₂O)ᵧ—H and —S—, x is 0 or 1, each y is independently an integer from 0 to 30 such that the group —(RM)ₓ—(CH₂CH₂O)ᵧ—H contains a total of 1 to about 30 ethoxy units and R' is an unsaturated or polyunsaturated fatty chain of from about six to about thirty carbons.

15. A method as set forth in claim 14 wherein the liquid is sour and the corrosion inhibitor further comprises a phosphate ester derived from a water-soluble oxyethylated, straight chain alcohol of from two to thirty carbons.

16. A method as set forth in claim 15 wherein the imidazoline and the phosphate ester are present in the corrosion inhibitor in a weight ratio of from 1:1 to 4:1.

17. A method as set forth in claim 15 wherein the corrosion inhibitor further comprises a solvent selected from the group consisting of water, ethylene glycol and propylene glycol.

18. A method as set forth in claim 17 wherein R is ethylene or —(CH₂CH₂O)ₙ(CH₂CH₂)—, wherein n is an integer from one to seventeen.

19. A method as set forth in claim 18 wherein the corrosion inhibitor further comprises a solvent selected from the group consisting of water, ethylene glycol and propylene glycol.

20. A method as set forth in claim 18 wherein the fatty chain is straight and has from about twelve to twenty carbons.

21. A method as set forth in claim 20 wherein the fatty chain is the residue from a fatty acid selected from the group consisting of oleic acid, linoleic acid and eladeic acid.

22. A method as set forth in claim 20 wherein each y is an integer from two to eighteen.

23. A method as set forth in claim 18 wherein the liquid is sweet.

24. A method as set forth in claim 18 wherein the corrosion inhibitor has an EC₅₀ for *Skeletonema costatum* greater than 1 ppm by weight.

25. A method as set forth in claim 14 wherein the fatty chain is straight and has from twelve to twenty carbons.

26. A method as set forth in claim 25 wherein the fatty chain is the residue from a fatty acid selected from the group consisting of oleic acid, linoleic acid and eladeic acid.

27. A method as set forth in claim 25 wherein each y is an integer from two to eighteen.

28. A method as set forth in claim 14 wherein the corrosion inhibitor has an EC₅₀ for *Skeletonema costatum* greater than 1 ppm by weight.

29. A method as set forth in claim 14 wherein R is ethylene or —(CH₂CH₂O)ₙ(CH₂CH₂)—, wherein n is an integer from one to seventeen.

30. A method as set forth in claim 29 wherein the liquid is sour and the corrosion inhibitor further comprises a phosphate ester derived from a water-soluble oxyethylated, straight chain alcohol of from two to thirty carbons.

31. A method as set forth in claim 30 wherein the imidazoline and the phosphate ester are present in the corrosion inhibitor in a weight ratio of from 1:1 to 4:1.

32. A method as set forth in claim 30 wherein the corrosion inhibitor further comprises a solvent selected from the group consisting of water, ethylene glycol and propylene glycol.

33. A method as set forth in claim 29 wherein the fatty chain is straight and has from twelve to twenty carbons.

34. A method as set forth in claim 33 wherein the fatty chain is the residue from a fatty acid selected from the group consisting of oleic acid, linoleic acid and eladeic acid.

35. A method as set forth in claim 33 wherein the N-ethoxy substituent has from two to eighteen ethoxy units.

36. A method as set forth in claim 29 wherein the corrosion inhibitor has an $EC_{50}$ for *Skeletonema costatum* greater than 1 ppm by weight.

* * * * *

UNITED STATES PATENT AND TRADEMARK OFFICE
CERTIFICATE OF CORRECTION

PATENT NO. : 5,785,895  Page 1 of 2
DATED : July 28, 1998
INVENTOR(S) : Richard L. Martin, Jo Ann McMahon, Bernardus A. Oude Alink

It is certified that error appears in the above-identified patent and that said Letters Patent is hereby corrected as shown below:

Column 4, line 11; the formula "=N(CH$_2$CH$_2$O)$_y$- H", should read: $\diagdown$N(CH$_2$CH$_2$O)$_y$-H $\diagup$ Claim 1; at Column 9,, line 9; the formula "=N(CH$_2$CH$_2$O)$_y$--H", should read:

$\diagdown$N(CH$_2$CH$_2$O)$_y$-H $\diagup$

Claim 4; at Column 9, line 39; the formula "=N(CH$_2$CH$_2$O)$_y$-H" should read:

$\diagdown$N(CH$_2$CH$_2$O)$_y$-H $\diagup$

Claim 14; at Column 10, at line 18, the formula "=NH(CH$_2$CH$_2$O)$_y$-H" should be replaced with:

$\diagdown$N(CH$_2$CH$_2$O)$_y$-H $\diagup$ at line 20, the formula -(RM)$_x$-(CH$_2$CH$_2$O)$_y$-H should be replaced with -(RM')$_x$-(CH$_2$CH$_2$O)$_y$-H.

UNITED STATES PATENT AND TRADEMARK OFFICE
CERTIFICATE OF CORRECTION

PATENT NO. : 5,785,895

DATED : July 28, 1998

INVENTOR(S) : Richard L. Martin, Jo Ann McMahon, Bernardus A. Oude Alink

It is certified that error appears in the above-identified patent and that said Letters Patent is hereby corrected as shown below:

Column 9, lines 11 and 12, delete "about".

Column 10, line 43, delete "about".

Signed and Sealed this

Fifteenth Day of June, 1999

Q. TODD DICKINSON

Attest:

Attesting Officer

Acting Commissioner of Patents and Trademarks